July 20, 1943. F. N. PETERS 2,324,874
PROCESS AND APPARATUS FOR TREATING FOODSTUFFS
Filed March 3, 1941
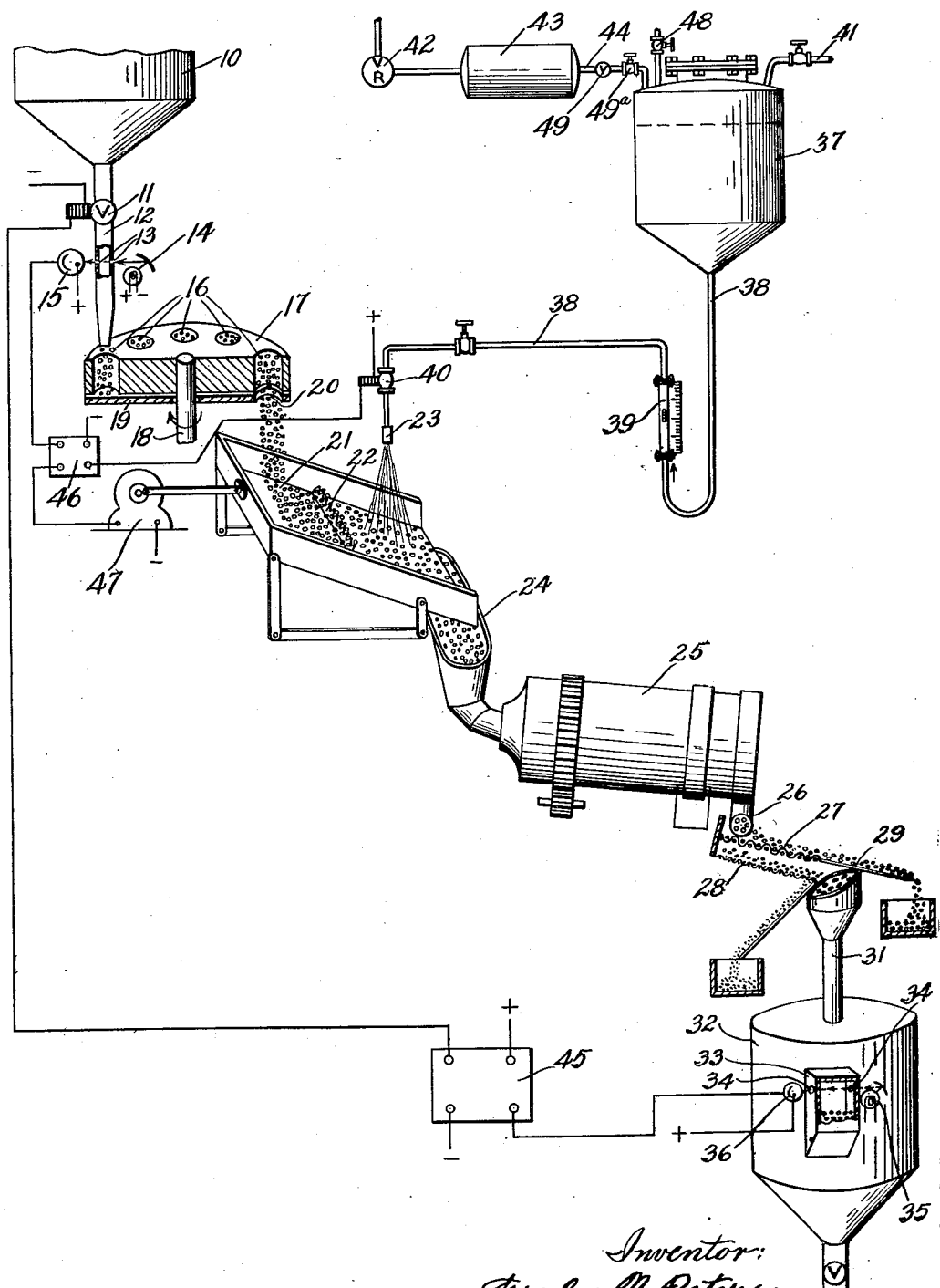
Inventor:
Fredus N. Peters.
By Thiess, Olson, & Mecklenburger
Attys.

Patented July 20, 1943

2,324,874

UNITED STATES PATENT OFFICE 2,324,874

PROCESS AND APPARATUS FOR TREATING FOODSTUFFS

Fredus N. Peters, Evanston, Ill., assignor to The Quaker Oats Company, Chicago, Ill., a corporation of New Jersey Application March 3, 1941, Serial No. 381,462

12 Claims. (Cl. 99—237)

The present invention relates to a new and improved method and apparatus for producing a fortified food product, and more particularly to a method and apparatus for vitaminizing ready-to-eat cereals of the character of puffed wheat, puffed rice, and the like.

Fortification of puffed cereal products such as puffed wheat, puffed rice, or the like, with various nutritional supplements presents an extraordinarily difficult problem, especially if the fortification is to be carried out on a commercial scale. Dietary supplements of the character of vitamins, either in the pure state or in their commercially available forms, are of course extremely potent and must therefore be distributed uniformly but in very minute quantities throughout the product. This basic requirement, as a practical matter, renders it desirable to use dilute solutions of the vitamins as a means for producing uniform distribution in almost microscopic quantities. The use of solvents, however, is complicated by the widely divergent physical and chemical properties of the various vitamins.

In the first place, the solubility characteristics of the various supplements differ widely since the vitamins include water-soluble, fat-soluble-water-insoluble and water-and-fat-insoluble materials. Moreover, the commercially available forms of the vitamins exist in both the solid and the liquid state. Furthermore, the widely divergent stability characteristics of the vitamins impose further drastic limitations on available methods of fortification. Thus, for example, certain of the vitamins (notably $B_1$ and C) are heat labile, especially in alkaline media, while others (notably A and C) are sensitive to oxidation. The sensitivity of these vitamins to heat and oxidation must of course be guarded against, not only during the preparation of the vitaminizing medium itself, but also during the fortification of the foodstuffs and the subsequent handling of the fortified cereal, particularly if the foodstuff must be dried after treatment with a fortifying medium.

In addition to the foregoing difficulties, as a result of extended investigation of possible means of fortifying puffed cereals of the character of puffed rice, puffed wheat and the like, we have found that unless the fortification of the cereal is controlled in the manner hereinafter described, enormous shrinkage in volume of the product will result. We have further found that the character of the cereal undergoing treatment, together with the sensitive nature of vitamins employed in the fortification process, necessitates the use of extreme care in the handling of the fortified product, inasmuch as abrasion, as well as exposure to elevated temperature for excessive periods of time, is detrimental to the finished product.

One of the objects of the present invention is to provide a new and improved process and apparatus for fortifying foodstuffs, which overcomes the above noted difficulties.

A further object is to provide a method and apparatus of the character described, which is applicable to all types of dietary supplements including the water-soluble, the fat-soluble-water-insoluble, and the water-and-fat-insoluble adjuncts, regardless of the chemical and thermal stability characteristics thereof.

Another object is to provide a rationally integrated and controlled method and apparatus for fortifying puffed cereal, which is adapted for large scale commercial operations, and which permits the uniform distribution of minute, precisely controlled amounts of a potent dietary supplement on the surface of the cereal product.

Another object is the provision of a process involving the vitamin-fortification of puffed cereals by means of a "vitamin rain," the operation being so regulated as to prevent excessive shrinkage of the cereal and the impairment of the labile vitamins during the operation, so that the vitamin potency of the finished product corresponds, within the limits of error inherent in vitamin assaying methods, to the theoretical calculated value based on the amount of materials used in the process.

The invention further contemplates a method and apparatus for fortifying puffed cereal by means of a "vitamin rain," which is so regulated that the spraying of the cereal is interrupted when the supply of untreated cereal becomes impeded or interrupted for any reason whatsoever, as well as when the quantity of the fortified vitamin in the final storage chamber attains a predetermined amount.

Other objects and advantages will be apparent as the invention is hereinafter more fully described.

To attain the foregoing objects, the present invention comprises the fortification of puffed cereals by a process which involves the spraying of an aqueous fortifying fluid of predetermined concentration on a uniform layer of cereal, passing at a uniform rate beneath a spray producing device. Thereafter the sprayed cereal is dried under controlled conditions such that the temperature of the cereal is not permitted to exceed 220° F. for a period in excess of one minute. The rate at which the fortifying fluid is sprayed on the cereal, relative to the rate at which the cereal moves past the spray device, is so regulated that the moisture pick-up of the cereal during the spraying operation is substantially less than 10%, and preferably less than 5% by weight.

The control of the moisture pick-up in accordance with the present invention has been found to be essential in order to avoid enormous shrinkage in volume of the cereal as a result of the evaporation of water from the sprayed cereal during the drying operation. The control of the drying operation in the manner specified is likewise essential in order not only to prevent substantial deterioration of any heat labile dietary supplements which may be employed in the fortifying fluid, but also to minimize shrinkage of the cereal product.

In accordance with a preferred embodiment of the present invention, the puffed cereal to be fortified is withdrawn from a storage chamber in periodically measured quantities and these measured quantities of withdrawn cereal are distributed in a uniform layer, preferably over an inclined surface which is vibrated in order to cause the cereal to move at a uniform rate downwardly across the surface. The aqueous fortifying fluid, of carefully adjusted concentration, and preferably but not necessarily comprising a vitaminizing liquid, is sprayed in the form of a "vitamin rain" on the layer of cereal as it moves across the inclined vibrating surface. The sprayed cereal is then passed through a drier, preferably of a continuous type, for example, a rotary drum drier, the time-temperature conditions prevailing during the drying operation being so controlled that none of the cereal in the drier attains a temperature in excess of 220° F. for a period in excess of one minute; that is, if the temperature of the cereal ever exceeds 220° F., then the time during which the cereal is at such increased temperature should not exceed a period of one minute. The dried cereal is then transferred from the drier to a storage chamber provided with positive means for cooling the cereal in order quickly to reduce the temperature of the product and thereby to prevent thermal decomposition of any heat labile fortifying agent.

The system is preferably provided with means for automatically interrupting the flow of fortifying fluid to the spray device when the supply of the cereal to the system is interrupted or impeded for any reason whatsoever. Desirably the supply of the cereal to the apparatus also is automatically interrupted when the quantity of the dried cooled cereal in the storage chamber for the treated product reaches a predetermined level. By this system of integrated control, the spray device will be automatically shut off either when a predetermined quantity of dried fortified cereal is produced or when the supply of untreated cereal is either exhausted or for any reason impeded or interrupted.

In order more clearly to disclose the nature of the present invention, reference is made to the accompanying single figure of the drawing, which diagrammatically represents a preferred system in accordance with the present invention. It should be clearly understood, however, that the system shown is merely an example illustrative of the principles of the present invention, and is not to be construed as a limitation upon the spirit or scope of the appended claims.

Referring now to the drawing, the untreated cereal is stored in a suitable bin or storage chamber 10. The cereal is withdrawn from the storage chamber through the solenoid actuated damper valve 11, and passes through the conduit 12 which is provided with two small ports or openings 13 in opposite walls thereof, which are so aligned as to permit a beam of light from the light source 14 to pass therethrough when the flow of cereal through the conduit 12 is interrupted. Adjacent the opening opposite to the source of light 14 there is placed a photo-electric cell 15 which actuates a control device hereinafter more particularly described.

The cereal is discharged from the conduit 12 into a suitable feeding device which may comprise, for example, a plurality of cylindrical chambers 16 in a wheel 17 rotating on the driven shaft 18. A fixed plate or disc 19 is placed beneath the rotating wheel 17 in order to prevent the cereal from falling through the cylindrical chambers 16 except when the chambers successively come into alignment with an opening 20 located immediately above the inclined shaker table 21. In this manner the cereal is withdrawn from the storage chamber 10 in periodically measured quantities which are discharged at a uniform rate onto the vibrating inclined surface 21 where they move downwardly across the table into engagement with a serrated baffle 22. The teeth of the serrated baffle 22 are bent at suitable angles across the length thereof so that the cereal product, as it passes between the baffle teeth, becomes uniformly distributed in the form of a layer over the entire surface of the shaker table. The resulting uniform layer of cereal moves at uniform rate downwardly across the table, beneath a suitable spray-producing device 23, which may take the form of a spray nozzle, preferably a spray nozzle of the type which operates without the use of admixed air. In case the fortifying fluid contains oils, the nozzle should be "adjusted for oil" by the manufacturer.

The sprayed cereal flows from the shaker table 21 into the feed chute 24 of any suitable drier 25, preferably of the rotary type. This drier desirably is heated by means of steam pipes (not shown) disposed within the drum parallel to the axis of rotation thereof. Preferably suitable baffles (not shown) are affixed to the inner wall of the rotating drum so that the cereal is picked up as the drum rotates and caused to fall downwardly between the steam pipes. Driers having revolving reels inside a fixed drum are less satisfactory because of undesirable abrading of the cereal. The temperature inside the drum, the rate of rotation of the drum and the arrangement of the baffles is so adjusted that the temperature of the cereal passing through the drum is not permitted to exceed 220° F. for any period in excess of one minute.

The dried cereal is discharged from the drier 25 through the discharge hood 26 whence it falls onto a coarse screen 27, the smaller particles passing therethrough onto a screen 28, while the larger particles are discharged from the system across the inclined surface 29. The kernels of intermediate size pass from the screen 28 into the supply conduit 31 of the bin or storage chamber 32, this bin being provided with means (not shown) for quickly cooling the dried cereal immediately after its withdrawal from the drying cylinder. The storage chamber is provided with a suitable level-actuated control mechanism which, as illustrated, may comprise a box 33 in free communication with the contents of the bin. Suitable ports 34 are provided in opposite walls of the box 33, these ports being so aligned as to permit a beam of light from the light source 35 to pass therefrom and to impinge upon the photo-electric cell 36 when the level of the cereal in the bin is below the aligned ports 34.

A fortifying fluid of carefully adjusted concentration is delivered to the spray nozzle 23 from the pressure vessel 37 through the conduit 38 which is provided with a flow meter 39 such as a rotameter and a solenoid operated valve 40. The fortifying fluid may be introduced into vessel 37 through the valved charging line 41. A gas under pressure, for example, compressed air, is introduced into the pressure vessel 37 above the liquid therein through the gas pressure reduction valve 42, the surge tank 43 and the air supply line 44. The latter is provided with a regulating valve 49 for fine adjustment and a regulating valve 49a for coarse adjustment of the air pressure in vessel 37, so that a substantially constant gas pressure may be maintained above the liquid in vessel 37 during spraying of the product, thereby assuring a substantially constant rate of supply of the fortifying fluid to the spray nozzle, the rate of supply being of course indicated by the flow meter 39.

The solenoid operated damper valve 11 in the discharge conduit for the storage bin 10 is connected with the control device 45 which is adapted to close the damper 11, when the level of the dried fortified cereal in the storage bin 32 rises above the level of the ports 34, thereby interrupting the beam of light impinging on the photo-electric cell 36. The photo-electric cell 15 adjacent one of the ports 13 in the discharge conduit from the bin 10 is likewise connected to a suitable control mechanism 46 which is adapted to maintain the solenoid actuated valve 40 controlling the supply of fortifying fluid to the nozzle 23 in an open position when the beam of light from the light source 14 is interrupted by the passage of cereal from the discharge conduit 12. The control device 46 also is adapted to shut off the supply of power to the motor 47 which actuates the shaker table 21, when the beam of light from the light source 14 impinges on the photo-electric cell 15 when the normal flow of cereal past the ports 13 is interrupted.

In operation, a fortifying fluid of predetermined concentration, such as that disclosed and claimed in the copending application of Peters and Rupp, Serial No. 381,582, filed of even date herewith, entitled "Vitaminizing fluid and method of preparing the same," is charged into the pressure vessel 37 through the charge line 41, the valve 49 in the air pressure line being closed, and the escape valve 48 being open to the atmosphere. When the pressure vessel 37 is charged with the fluid, the escape valve 48 is closed, and the valve 49 in the air pressure line is opened, the reduction valve 42 being adjusted in order to maintain a constant pressure in the vessel 37.

When the cereal begins to flow through the discharge conduit 11 from the storage bin 10, the photo-electric control device 46 opens the valve 40 in the fluid supply line 38 and simultaneously supplies power to the motor 47 which actuates the shaker table 21. The cereal falls past the ports 13 in the supply conduit and is discharged into the chambers 16 of the rotating wheel 17. When the chambers progressively come into alignment with the opening 20 in the stationary disc 19, cereal contained therein is discharged onto the shaker table 21 where the cereal falls downwardly through the adjusted teeth of the serrated baffle 22 to form a uniform layer of cereal, moving at a uniform rate beneath the spray nozzle 23.

The cereal passes through the drier 25 under the controlled conditions hereinbefore mentioned and thence is discharged onto the screens 27 and 28, the intermediate size particles passing into the storage bin 32. When the flow of cereal from the bin 10 is interrupted, for example by the exhaustion of the supply, the beam of light from the light source 14 impinges on the photo-electric cell 15 which actuates the control device 46 to close the solenoid operated valve 40 in the fluid supply line 38, and also to disconnect the motor 47 from the power circuit.

If during normal operation, the level of the dried product in the bin 32 rises above the ports 34, the beam of light from the light source 35 is interrupted and the control device 45 is actuated to close the damper valve 11 in the supply line from the bin 10. The closing of the damper valve 11 permits the beam from the light source 14 to impinge on the photo-electric cell 15, thereby actuating the controller 46 to shut off the power to the motor 47 and to close the solenoid actuated valve 40 in the fluid supply line 38.

In the foregoing detailed description, it will be readily apparent that many variations may be made without departing from the spirit and scope of the present invention. Thus while we have illustrated certain specific forms of apparatus for carrying out the invention, other equivalent means may readily be substituted for those shown. Likewise while the invention has been described with reference to the fortification of cereals with vitamins, the system has many fields of application as will be apparent to those skilled in the art. I therefore intend to be restricted only in accordance with the following patent claims.

I claim:

1. A method of fortifying puffed cereal, which comprises spraying an aqueous fortifying fluid of predetermined concentration on a uniform supported layer of cereal moving at a uniform rate down an inclined supporting surface, vibrating said surface, and drying said sprayed cereal under such controlled conditions that the temperature of the cereal being dried does not during any period in excess of one minute exceed a temperature of 220° F.

2. A method of fortifying puffed cereal, which comprises spraying an aqueous fortifying fluid of predetermined concentration on a uniform supported layer of cereal moving at a uniform rate down an inclined supporting surface, vibrating said surface, drying said sprayed cereal under controlled conditions such that the temperature of the cereal during the drying does not during any period in excess of one minute exceed a temperature of 220° F., and quickly cooling said cereal after said drying operation.

3. A method of fortifying puffed cereal, which comprises spraying an aqueous fortifying fluid of predetermined concentration on a uniform supported layer of cereal moving at a uniform rate down an inclined supporting surface, vibrating said surface, drying said sprayed cereal under controlled conditions such that the temperature of the cereal during the drying does not during any period in excess of one minute exceed a temperature of 220° F., and regulating the rate at which the fortifying fluid is sprayed on the cereal relative to the rate at which the cereal moves past the spray so that the moisture pick-up of the cereal during said spraying step is less than 5% by weight.

4. A method of fortifying puffed cereal, which comprises spraying an aqueous fortifying fluid of predetermined concentration on a uniform supported layer of cereal moving at a uniform rate down an inclined supporting surface, vibrating said surface, drying said sprayed cereal under controlled conditions such that the temperature of the cereal being dried does not during any period in excess of one minute exceed a temperature of 200° F., quickly cooling said cereal after said drying operation, and regulating the rate at which the fortifying fluid is sprayed on the cereal relative to the rate at which the cereal moves past the spray so that the moisture pick-up of the cereal during the spraying operation is less than 5% by weight.

5. A method of fortifying puffed cereal with vitamins, which comprises distributing a measured quantity of cereal in a uniform layer over an inclined supporting surface, vibrating said surface to cause said cereal to flow in a uniform layer downwardly across said surface, spraying an aqueous vitaminizing fluid of predetermined concentration on said layer of cereal, drying said sprayed cereal under controlled conditions such that the temperature of the cereal during any period in excess of one minute does not exceed 220° F. and regulating the rate at which the vitaminizing fluid is sprayed on the cereal relative to the rate at which the layer of cereal flows across said surface.

6. Method of fortifying puffed cereal with vitamins, which comprises measuring a quantity of cereal, distributing the measured quantity of cereal in a uniform layer over an inclined surface, vibrating the inclined surface to cause said cereal to move at a uniform rate downwardly across said surface, spraying an aqueous vitaminizing fluid of predetermined concentration on said cereal as it moves across said surface, drying said sprayed cereal under controlled conditions such that the temperature of the cereal does not exceed 220° F. for any period in excess of one minute, cooling the dried cereal, and regulating the rate at which the vitaminizing fluid is sprayed on the cereal relative to the rate at which the cereal moves across said inclined surface so that the moisture pick-up of the cereal during the spraying operation is less than 5% by weight.

7. An apparatus of the character described comprising, in combination, an inclined table, a distributor for distributing a measured quantity of cereal in a uniform layer on said table, vibrator means for vibrating said table to cause said layer of cereal to flow at a uniform rate downwardly across said table, spray producing means disposed above said table to spray an aqueous fortifying fluid on said layer as it moves across said table, a supply conduit for supplying fortifying fluid to said spray nozzle, a drier for drying the sprayed cereal, means for conducting the sprayed cereal from said table to said drier, means for discharging said cereal from said drier, and control means for regulating the rate at which the fluid is supplied to said fluid supply conduit.

8. An apparatus of the character described comprising, in combination, an inclined table, a distributor for distributing a measured quantity of cereal in a uniform layer on said table, vibrator means for vibrating said table to cause said layer of cereal to flow at a uniform rate downwardly across said table, spray producing means disposed above said table to spray an aqueous fortifying fluid on said layer as it moves across said table, a supply conduit for supplying fortifying fluid to said spray nozzle, a drier for drying the sprayed cereal, means for conducting the sprayed cereal from said table to said drier, means for discharging said cereal from said drier, and control means for regulating the rate at which the fluid is supplied to said fluid supply conduit relative to the rate at which the cereal moves across said table, whereby the moisture pick-up of the cereal during the spraying operation is maintained at less than 5 per cent by weight.

9. An apparatus of the character described comprising, in combination, a storage chamber for untreated cereal, an inclined table, a distributor for distributing a measured quantity of cereal in a uniform layer across said table, a valved conduit for supplying cereal from said storage chamber to said distributor, vibrating means for vibrating said table to cause said layer of cereal to move at a uniform rate downwardly across said table, spray producing means disposed above said table to spray an aqueous fortifying fluid on said layer as it moves across said table, a supply conduit for supplying fortifying fluid to said spray producing means, a drier for drying sprayed cereal, means for conducting the sprayed cereal from said table to said drier, a storage chamber for dried cereal, means for conducting said dried cereal from said drier to said storage chamber, control means actuated by the quantity of the cereal in said second mentioned storage chamber for closing the valve in the discharge conduit from said first mentioned storage chamber when the quantity of cereal in the second mentioned chamber attains a predetermined amount, and control means actuated by the flow of cereal from the first mentioned storage chamber for interrupting the supply of fortifying fluid in said supply conduit when the cereal supply is interrupted.

10. An apparatus of the character described comprising, in combination, a storage chamber for untreated cereal, an inclined table, a feeder for discharging periodically measured quantities of cereal onto said inclined table, a valved conduit for supplying cereal from said storage chamber to said feeder, a distributor for distributing the cereal deposited on said table in the form of a uniform layer thereover, vibrator means for vibrating said table to cause said layer of cereal to move at a uniform rate downwardly across said table, spray producing means disposed above said table to spray an aqueous fortifying fluid on said cereal as it moves across said table, a fluid supply tank for said fortifying fluid, a supply conduit for supplying fortifying fluid from said fluid supply tank to said spray nozzle, means for maintaining a uniform superatmospheric gas pressure on the fluid in said fluid supply vessel, a drier for drying sprayed cereal, means for conducting the sprayed cereal from said table to said drier, control means for regulating the rate at which the fluid is supplied from said fluid supply vessel relative to the rate at which the cereal is supplied to said table so that the moisture pick-up of the cereal during the spraying operation is less than 5% by weight, a storage chamber for dried cereal, means for conducting the dried cereal from said drier to said storage chamber, control means actuated by the level of the cereal in said second mentioned storage tank for closing the valve in a discharge conduit from the first mentioned storage chamber when the quantity of dried cereal in the second mentioned chamber attains a predetermined amount, and control means actuated by the flow of cereal from the first mentioned storage chamber for interrupting the fluid supply to said spray producing means when the cereal supply to said feeder is interrupted.

11. Method of vitaminizing particulate cereals in the form of small masses which comprises disposing said masses upon an inclined supporting surface to form thereon a layer of a depth substantially equal to that of a single mass, vibrating said surface to effect the continuous transit of said supported layer past a given line, continuously impelling against and upon said moving layer a fine spray of water-containing vitamin material in an amount so proportioned that the moisture thus imparted to the masses does not exceed about 10% of their weight, and thereafter drying the thus vitaminized masses under conditions avoiding the attainment thereby of a temperature which during any given period of one minute substantially exceeds 220° F.

12. Method of vitaminizing a cereal product in the form of puffed particles which comprises disposing said puffed particles upon an inclined supporting surface to form thereon a layer of a depth substantially equal to that of the diameter of a single particle, vibrating said surface to effect the continuous transit of said supported layer of particles past a given line, continuously impelling against and upon said moving layer a fine spray of water-containing mixed vitamin material in an amount so proportioned that the moisture thus imparted to the particles does not exceed about 5% of their weight, and thereafter drying the thus vitaminized puffed particles under conditions avoiding the attainment thereby of a temperature which during any given period of one minute substantially exceeds 220° F.

FREDUS N. PETERS.